Nov. 7, 1939.  W. PAULUS  2,179,454
WINDSHIELD WIPER
Filed June 17, 1937
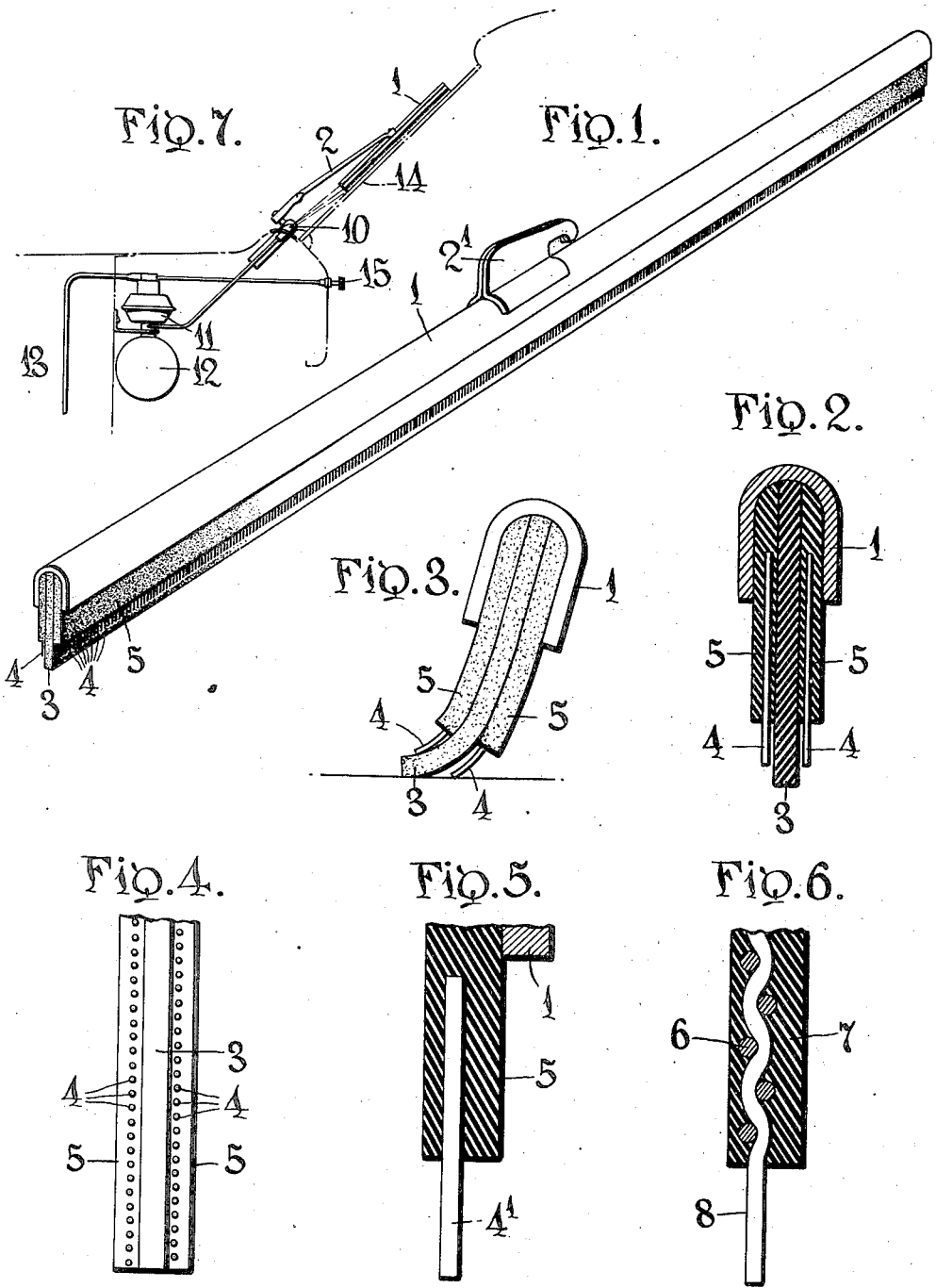
INVENTOR
William Paulus,
BY
Beau, Brooks, Buckley & Beau.
ATTORNEYS Patented Nov. 7, 1939

2,179,454

UNITED STATES PATENT OFFICE 2,179,454

WINDSHIELD WIPER

William Paulus, Buffalo, N. Y., assignor to Trico Products Corporation, Buffalo, N. Y.

Application June 17, 1937, Serial No. 148,699

6 Claims. (Cl. 15—250)

This invention relates to a windshield wiper and particularly to the wiping element or blade which has wiping contact with the window or windshield glass. Heretofore the wiping blade, of various forms and constructions, was designed primarily to wipe the glass surface free of any moisture thereon, or at least remove all moisture in excess to the remaining wet film.

The present day motor vehicle is designed to travel at high rates of speed and as a result, the windshield is continuously becoming covered with insects and other vision obscuring matter, rendering it difficult to have clear vision through the transparency. The bugs and insects are frequently crushed by their impact against the windshield and if the refuse is not immediately removed, it dries and becomes hardened, and requires special attention to remove the same.

Of late it has been proposed to spray a liquid on the windshield for use in cooperation with the wiper in removing such refuse but when the latter has hardened, the present day wiper is slow in its effectiveness to clean the glass.

The present invention has for its object to provide a wiper which will not only spread the liquid which is sprayed on the windshield and wipe the glass free of excess moisture but will also break up and disintegrate any hardened vision obscuring matter on the windshield to expedite the loosening and softening of the same by the liquid.

Further, the invention has for its object to provide a wiper which will be efficient in operation and self-cleaning in action, its construction being such that the foreign matter which it contacts will be wiped clear thereof without matting or clogging the blade in its efficient function.

In the drawing—

Fig. 1 shows a wiper in perspective embodying the present invention;

Fig. 2 is a transverse sectional view therethrough;

Fig. 3 depicts the wiper in action, and

Figs. 4, 5 and 6 illustrate modified embodiments of the invention.

Referring more particularly to the drawing, the numeral 1 designates the usual metal channel or holder constituting the back of the blade which latter is attached to its actuating arm 2 by a clip or fin 2'. Within the channel of the holder is clamped a wiping body 3, such as a rubber ply, designed for having wiping engagement with the window surface as the wiper is moved back and forth by its usual actuating arm. The fin or attaching member 2 is so connected to the arm that the wiper may rock on its wiping edge at the beginning of each stroke and consequently the wiping edge will trail at an incline, somewhat as illustrated in Fig. 3.

Means are provided on one or both sides of the wiping ply or edge 3 for disintegrating or breaking up any hardened matter in advance of the wiping contact. This disintegrating means is preferably formed as an integral part of the wiper, and is illustrated as comprising a series of bristles 4, which are embedded in a strip-like base or body of rubber 5, one bristle holding ply being disposed on either side of the wiping ply and clamped therewith between the sides of the channeled holder. The free ends of the bristles are stepped backwardly from the wiping edge 3 so as to permit the latter lapping the glass in full contact behind the advancing bristles. The bristles may be comparatively short, as shown in Fig. 5, or they may be extended upwardly to be embraced by the sides of the holder for firmer securement. The bristles may be formed of horsehair, fine wire, coarse threads, or other material, preferably of a non-absorbing character and of such texture as not to mar the glass. In action they engage the hardened matter on the glass and scratch into the same to break it up to more readily enable the rain or other liquid which may be applied to the glass to rapidly impregnate and effectively soften and loosen the vision obscuring matter for ready removal from the field of vision by the trailing edge 3. Under a heavier wiping contact or pressure, such as when passing over a partially wet glass, or when the arm pressure is abnormal, the advancing bristles will bend further beneath the wiping edge 3 so that the latter will serve to back the bristles and exert lateral pressure down upon them to increase the disintegrating action thereof. When a bristle holding strip is disposed on both sides of the wiping body the bristles of the two sets may be arranged directly opposite to each other, or they may be staggered, as shown in Fig. 4, the latter arrangement insuring the return stroke of the wiper engaging a different portion of the vision obscuring matter from that engaged by the bristles on the preceding stroke. Instead of mounting the bristles individually in a rubber base, as shown in Figs. 2 and 5, they may consist of projecting strands from a woven fabric body 6. The fabric body may be directly inserted in the holder or it may be incorporated in a body of rubber 7 from which the strands 8 project, as depicted in Fig. 6.

The disintegrating members or bristles, while pliable, will nevertheless embed themselves in their backing ply 3, when the latter is pressed firmly thereon, and thus be supported on opposite sides by the rubber extending between the free ends of the bristles.

In practice the vehicle may be equipped with a liquid spray nozzle 10 through which water or other liquid solvent is sprayed by a pump 11, the liquid being supplied from the reservoir 12. The pump may be connected to the intake manifold by the pipe 13 for low pressure operation. The form or construction of this liquid applying apparatus may be somewhat along the lines of that disclosed in my application for patent on a Window clearing system filed October 12, 1935 under Serial No. 35,852, the operation of which is automatic in its application of fluid to the windshield glass 14. The motorist is merely required to pull the knob 15 outwardly to start the pump, and while the fluid is being applied the wiper is moving back and forth on the glass so that a continual flow of the liquid on the glass is obtained to hasten the softening and loosening action of the bristles as they cut into and through the hardened matter on the window. The liquid will wash the window surface free of the loosened matter, and consequently the field of vision is not only wiped clean but washed clear of the foreign matter in an efficient manner. The bristles are self-cleaning in their action, since any foreign matter adhering thereto is wiped therealong and finally off their extreme ends.

The foregoing description, which has been given in detail, is merely illustrative of the inventive principles involved, which may obviously be incorporated in other physical embodiments without departing from the spirit or scope of the invention claimed.

What is claimed is:

1. A windshield wiper comprising a flexible wiping member and a flexible bristle carrying body secured together in a channeled holder, the bristles extending from the body along the side of the wiping member.

2. A windshield wiper for motor vehicles, comprising a wiping ply and a bristle carrying ply of rubber like material secured in advance of its wiping edge within a channeled holder, the free ends of the bristles extending alongside of the wiping ply for overlying the same and having their opposite ends interconnected by interwoven means and embedded therewith in the carrying ply.

3. A windshield wiper for motor vehicles, comprising a flexible wiping member and a flexible bristle carrying member fixedly secured thereto in advance of its wiping edge, the free ends of the bristles terminating short of the extreme wiping edge of said wiping member.

4. A wiper for windshield cleaners of motor vehicles, comprising a resilient wiping member, and a resilient side ply secured to the wiping member and having its outer edge movable therefrom, said side ply having a row of bristles extending from its outer edge alongside of the wiping member, the free edges of the bristles being stepped inwardly from the wiping edge.

5. A wiper for windshield cleaners of motor vehicles, comprising a flexible wiping member and a series of bristles flexibly supported on each side of the wiping member and secured thereto a distance back from its active wiping edge, said two series of bristles extending toward the wiping edge of the wiping member for alternately bearing on the respective side faces of the latter during the flexing back and forth thereof as the wiper is reciprocated on the windshield.

6. A wiper for windshield cleaners of motor vehicles, comprising a rubber wiping ply, and a rubber side ply on each side of the wiping ply secured thereto, each side ply having bristles embedded therein and extending free therefrom toward the wiping edge of the intermediate ply but terminating short thereof.

WILLIAM PAULUS.